(12) United States Patent
Arbon et al.

(10) Patent No.: US 11,048,619 B2
(45) Date of Patent: Jun. 29, 2021

(54) AI SOFTWARE TESTING SYSTEM AND METHOD

(71) Applicant: Appdiff, Inc., San Francisco, CA (US)

(72) Inventors: Jason Joseph Arbon, San Francisco, CA (US); Justin Mingjay Liu, San Francisco, CA (US); Christopher Randall Navrides, San Francisco, CA (US)

(73) Assignee: APPDIFF, INC., San Francisco, CA (US)

( * ) Notice: Subject to any disclaimer, the term of this patent is extended or adjusted under 35 U.S.C. 154(b) by 106 days.

(21) Appl. No.: 16/400,861

(22) Filed: May 1, 2019

(65) Prior Publication Data

US 2019/0384699 A1    Dec. 19, 2019

Related U.S. Application Data

(60) Provisional application No. 62/731,717, filed on Sep. 14, 2018, provisional application No. 62/665,384, filed on May 1, 2018.

(51) Int. Cl.
| | |
|---|---|
| *G06F 11/00* | (2006.01) |
| *G06F 11/36* | (2006.01) |
| *G06N 20/00* | (2019.01) |
| *G06F 3/0484* | (2013.01) |

(52) U.S. Cl.
CPC ...... *G06F 11/3684* (2013.01); *G06F 11/3664* (2013.01); *G06F 11/3688* (2013.01); *G06F 11/3692* (2013.01); *G06N 20/00* (2019.01); *G06F 3/0484* (2013.01)

(58) Field of Classification Search
CPC ............ G06F 11/3684; G06F 11/3688; G06F 11/3692; G06F 11/3664; G06F 11/3616
See application file for complete search history.

(56) References Cited

U.S. PATENT DOCUMENTS

| | | | |
|---|---|---|---|
| 10,509,717 B1 * | 12/2019 | Surana | G06F 11/3664 |
| 2009/0217302 A1 | 8/2009 | Grechanik et al. | |
| 2015/0339213 A1 * | 11/2015 | Lee | G06F 3/0484 |
| | | | 717/125 |
| 2015/0363304 A1 * | 12/2015 | Nagamalla | G06F 11/3648 |
| | | | 702/123 |
| 2017/0212829 A1 | 7/2017 | Bales et al. | |
| 2019/0129701 A1 * | 5/2019 | Hawrylo | G06F 8/65 |

OTHER PUBLICATIONS

International Search Report for PCT/US2019/049185 filed Aug. 30, 2019, dated Nov. 13, 2019, 20 pgs.

* cited by examiner

*Primary Examiner* — Charles Ehne
(74) *Attorney, Agent, or Firm* — Patent Law Works LLP

(57) ABSTRACT

A system for performing software testing uses machine learning to extract features from a user interface of an app, classify screen types and screen elements of the user interface, and implement flows of test sequences to test the app. Training is performed to train the system to learn common application states of an application graph and to navigate through an application. In some implementations, the training includes Q-learning to learn how to navigate to a selected screen state. In some implementations, there is reuse of classifiers cross-application and cross platform.

28 Claims, 16 Drawing Sheets

Choose a Category:

| |
|---|
| Intro Screen/Welcome Screen |
| Login Screen/Sign Up Screen |
| Privacy Policy Screen/Terms and Conditions Screen |
| Home Screen |
| Side Menu Screen |
| Popup Screen |
| Others |
| Describe for Other Category: |

510

Submit

FIG. 5A

≡ IHG Rewards Club     📶 🔋 1:39     Sign in

Would you like to receive push notifications to be notified when it's time to check in, when your room is ready and be the first to receive exclusive mobile app offers?

Not now     OK

IHG® Rewards Club members save more when booking with us.

▽ ○ □

505

AI SOFTWARE TESTING SYSTEM AND METHOD

CROSS REFERENCE TO RELATED APPLICATIONS

The present application claims priority under 35 USC § 119(e) to U.S. Provisional Patent Application No. 62/731,717, entitled "Real Time AI Test Execution" and filed Sep. 14, 2018, and U.S. Provisional Patent Application No. 62/665,384, entitled "AI Software Testing System and Method" and filed May 1, 2018, each of which are incorporated herein by reference in their entirety.

TECHNICAL FIELD

Embodiments of this disclosure are generally related to techniques to test software applications.

BACKGROUND

Many software applications ("apps") have sequences of graphical user interface (GUI) screens that need to be tested. For example, many websites or mobile apps have a home screen, a login screen, shopping carts, site search screens, etc. These apps need to be tested for a variety of reasons. Testing may be required when an app is developed, when it is updated, or to perform a performance review. However, conventional techniques for debugging applications are inadequate in the sense that the ability to design and create new software apps is outpacing the ability to test apps using conventional manual techniques. Additionally, conventional techniques for debugging do not provide meaningful performance comparisons with other apps.

SUMMARY

A machine learning system is disclosed to test software. The machine learning system includes a trained machine learning model, methods of training the machine learning model, and methods of generating training data.

In one embodiment, a system for performing software testing uses machine learning to extract features from a user interface of an app, classify screens and elements of the user interface, and implement flows of test sequences to test the app. In one embodiment, the software application has an associated logical state graph associated with potential user interactions with a graphical user interface. Training is performed to train the system to learn common application states of an application graph and to navigate through an application. In some implementations, the training includes Q-learning to learn how to navigate to a selected screen state. In some implementations, there is reuse of classifiers cross application and cross platform.

In one embodiment, an artificial intelligence software testing system is used to test software applications having sequence of screens with each screen having a set of screen elements. A set of intelligent machine learning bots are trained to crawl through a software application and identify screens and screen elements of the screens. Test cases are applied to the software application. A specific test case may be applied. However, in one embodiment, the test cases are identified based on the identified screen types and screen elements. In one embodiment a report of the test results is generated for the application. In some embodiments, the test cases correspond to testing a test sequence or a test flow.

In one embodiment, a set of classifiers is trained to identify screen types and screen elements of the screens. In one embodiment, the set of classifiers includes a classifier trained to analyze a visual appearance of a graphical user interface using a classifier trained to analyze a visual appearance of graphical user interfaces. Other examples of classifiers include a classifier trained to analyze a visual appearance of text, such as identifying words or phrases on a screen. The trained classifiers are used to identify screen types and screen elements of the screens using the classifiers.

In some embodiments, the classifiers are trained to recognize common screens and screen elements in a nodal graph. Some examples of common screens found in many different software apps include a search screen, a shopping cart screen, product information screen, a sign-in screen, a sign-out screen, and a checkout screen. In some embodiments, the machine learning model is trained to analyze elements, screens, and flows of applications.

In one embodiment, the testing is performed across application and cross-platform. In one implementation, a conversion table is applied to adjust the testing for differences in software application appearance and formatting on different platforms, devices, and screen sizes or densities.

In one embodiment a set of classifiers are trained to analyze images on the screens to identify displayable user interface elements of the software application.

In one embodiment, the machine learning system is trained on test applications to navigate sequences of screen states. In one embodiment, the training includes training a set of machine learning mini-brains to each navigate a sub-region of the node graph. In one embodiment, each mini-brain is trained to navigate to a specific screen type.

In one embodiment, a method of testing software applications having sequence of screens with each screen having a set of screen elements, includes crawling through screens of a software application; and for each screen, determining a nodal graph state associated with the screen from a set of at least two different nodal graph states, and in response selecting a machine learning model trained for the determined nodal graph state; and reporting test results for the software application.

In one embodiment, the machine learning system has a set of classifiers trained on screen images to recognize screen types and screen elements.

In one embodiment, a method of using artificial intelligence to test software applications having sequence of screens with each screen having a set of screen elements includes crawling through a software application. A set of classifiers is trained to identify screen types and screen elements of the screens. A conversion layer or a conversion table is applied to adjust for differences in screen element appearance and formatting on different platforms, screen resolution, or placement. In one embodiment, a screen source is converted to an abstract layer common to a plurality of different platforms, and image analysis is performed on the abstract layer to extract screen and element information for the plurality of different platforms.

In one embodiment, the machine learning system is trained to adjust for differences in screen element appearance and formatting in different platforms.

In one embodiment, the machine learning system is trained to compare a performance of a software app with other apps on the same or different platforms.

In one embodiment, the machine learning system is trained to learn from testing different applications to identify similarities between software applications on different platforms.

In one embodiment, the machine learning system is trained to generate a report comparing a performance of a tested software application to a set of benchmarks.

In one embodiment, the machine learning system is trained to understand abstract intent. An exemplary method includes performing initial and on-going training of a set of intelligent machine learning bots to: crawl through software applications having an associated logical state graph associated with a set of potential user interactions with a graphical user interface; identify screen types and screen elements of the screens using a set of trained classifiers, including classifiers trained to analyze images representative of states of the logical state graph; determine application states and a flow of sequences of states of the logical state graph; identify test cases based on the identified screen types and screen elements; apply the identified test cases to the software application; and report test results for the software application. In some embodiments, deduplication is performed of common states in the logical state graph. In one embodiment, the machine learning system is trained to name sequences of states, test specific inputs per app state, and verify specific app features or strings in a given state. In one embodiment machine learning system is trained to understand logical states of a logical application graph. In one embodiment, the training comprises training on canonical logical application graphs and sub-graphs. In one embodiment the training comprises cross-application graph training. In one embodiment, the training comprises Q-learning training based on training data of real-world application usage. In one embodiment, the training comprises training cross-application Q-learning.

In one embodiment, the machine learning system is trained to compare a performance of the software application to a performance of at least one other application. In one embodiment the comparison comprises comparing a number of steps required to perform a sequence of actions by a user. In one embodiment, the comparison comprises identifying another related software application based on a similarity test. In one embodiment, the comparison comprises comparing the performance of the software application to a benchmark.

In one embodiment, the machine learning system is trained to crawl a software application; perform at least image classification of the visual appearance of a graphical user interface of the software application; identify (a set of) user interface screen elements that can be interacted with by a user or machine learning system; determine screen types and screen elements of the graphical user interface of the software application; determine various navigational paths that lead between two distinct screen types; test screen interactions with the graphical user interface based on a set of test cases selected based on the determined screen types and screen elements; produce a report that describes a sequence of screen transitions necessary to reproduce a test case; generate a display profiling a performance of the software application; provide a way to compare test sequences executed in two or more different apps.

BRIEF DESCRIPTION OF THE DRAWINGS

FIG. 5A illustrates an example of labeling a screen in accordance with an embodiment.

DETAILED DESCRIPTION

ML Testing System Overview

Figure 1:
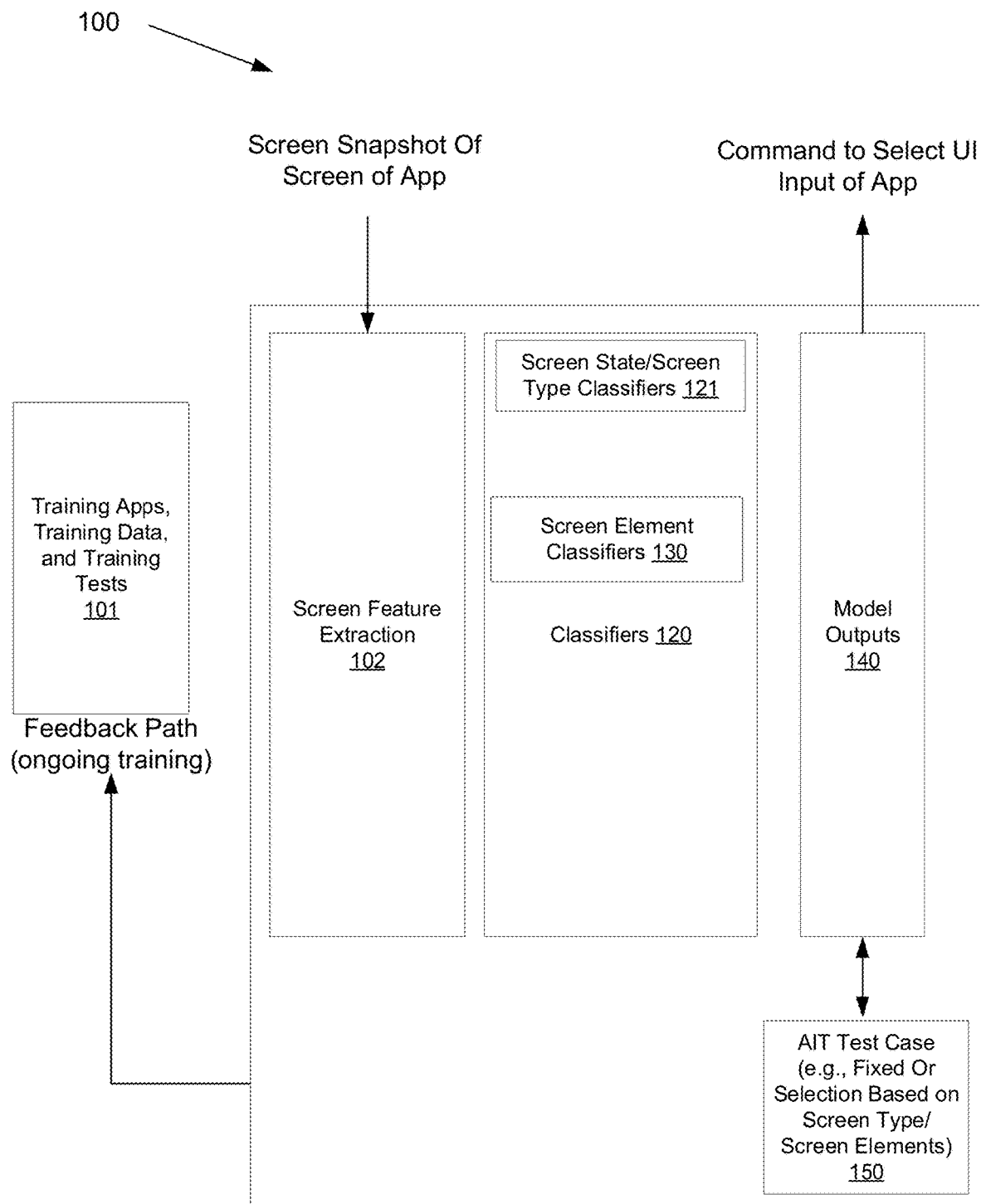
FIG. 1 illustrates a software testing system in accordance with an embodiment.

Referring to FIG. 1, in one embodiment, an artificial intelligence (AI) engine/machine learning (ML) system 100 is trained and used to test software apps. The ML system may include an input layer, a hidden layer, and an output layer. In some embodiments, the machine learning system 100 may be based on supervised learning or reward learning. More generally, unless otherwise specified, the machine learning may be based on any ML technology in which the machine learning system 100 is provided with training data 101 and attempts to build a function that satisfies the input and output tests. Some examples of machine learning technology include: supervised learning, unsupervised learning, reinforcement learning, Q-learning, etc. It would be understood that the machine learning system includes hardware components (e.g., processors, memory, a database, and network adapters/communication interfaces) and user interfaces to execute computer program instructions, stored on a non-transitory computer readable medium for generating training data/training programs, using the training data to train machine learning models of the machine learning system, and for using the trained machine learning system to test software applications and generate reports.

In one embodiment, the ML system 100 is further organized into bots (autonomous agents) to perform various functions to analyze and test software apps. A set of bots includes at least one bot, although more generally an arbitrary number of bots may be supported consistent with optimizing performance, resource usage, or other aspects of the ML system in regards to testing software apps. In one implementation a smart bot automatically explores an app (e.g., crawls an app) and looks for issues in how the application functions, which may include looking for changes, measuring performance, and looking for crashes or bugs. The ML system 100 can be deployed in different ways. As examples, the system can be implemented as a local version, a cloud/SA product, or an on-premise deployment.

A software app to be tested has a sequence of GUI screens. In one embodiment, at least some of the GUI screens of a software app to be tested correspond to an application graph in which individual screens correspond to nodes (logical states) in the application graph. Examples include a variety of non-gaming apps, such as ecommerce apps having screens such as a product information screen, a home screen, a shopping screen, a checkout screen, a login screen, a logout screen, etc. That is, an application has a corresponding logical graph/state diagram having nodes that correspond to individual UI screens of the app, such as search, home, intro, cart, product, intro, profile, etc.

Machine learning (ML) permits training of the machine learning system 100 to recognize application state by providing training information 101, such as training data, training apps, and training tests. In one embodiment, screens of training are labelled to train the ML system 100 to identify screen type (and associated screen state), screen elements, and flows (sequences) of screen states for navigation. Training apps may have application graphs selected so that the ML system 100 learns how to navigate screen states in common software apps.

Human beings can perform labelling of each screen to train the ML. In one embodiment, a labelling tool can be provided to aid in the labeling process with selections for common UI screens such as login, signup, home screen, etc. Other aspects of the training data can be labelled, such as information associated with screen elements, screen sequences of navigation, etc.

The ML system 100 can then be taught how to decide on correct input actions based on what screen state the application is in. ML bots can be taught to verify that an application is behaving correctly. This can include learning that certain output strings are likely to be bugs in an application, such as "sorry", "oops" or "try again." Training apps and training test cases may thus be used to train the ML system 100 to learn to identify potential bugs or other issues with an app, including analyzing performance metrics of the app. After an initial training phase, ongoing feedback may be provided for the ML system 100 to learn from ongoing testing of software apps. This may include, for example, automated or human-assisted quality assurance (QA) feedback. In one embodiment, the trained ML system is used to test large number of apps for different platforms such that it learns, over time, from cross-application and cross-platform applications. That can be considered to be a type of transfer learning.

A typical app may have a sequence of GUI screens in which there is more than one possible way to navigate the screens. For example, an app for a website or mobile app may have screens to go from a home screen, a login screen, and screens to procure a service or good, such as an order screen, cart screen, and checkout screen.

In the following discussion, the term "screens" is used generically to describe a set of graphical user interface fields displayable on a screen (web pages for websites displayed on screens capable of displaying a web page; mobile device formatted screens for mobile devices).

In one embodiment, a snapshot of a screen of an app is received by the ML system 100. In one embodiment, screen feature extraction 102 is performed by the ML system 100. In one embodiment, a set of classifiers 120 (e.g., an ensemble of classifiers) includes classifiers to classify screen type 121 and classifiers to classify screen elements 130. Model outputs 140 are generated, which may include selecting UI commands to stop the application and implement an AI test case 150 of a test flow, where the AI test case may be previously selected or be dynamically selected based on the screen type, screen elements, and sequence of previous screen states/screen elements.

For example, the classification may identify a screen as being one of a common type of screen types such as a login screen, search screen, shopping cart screen, etc. In some embodiments, the screen type is determined, at least in part, by classifying a visual appearance of a screen, such as classifying screen images to determine whether an image is an image of a shopping cart. However, text may also be classified to identify frequently used words associated with particular screen types. Other aspects of the screen may be classified, such as metadata and Document Object Model (DOM) data. In one embodiment, the classification includes identifying screen types and screen elements associated with input/output pairs.

In one embodiment, the ML system 100 generates commands to select UI inputs for the app, such as commands to enter inputs to the app (e.g., a text input) and UI input commands, such as tap/swipe/select. Thus, the ML system can generate commands to step the app through a sequence of a test flow. In one embodiment, the machine learning system also selects an AI test (AIT) case based at least in part on the screen state/type. However, more generally, the machine learning system may also be provided with an AI test case.

In one embodiment, the ML system 100 is trained using training data selected to train the ML system 100 to identify screen state/screen type, identify screen elements, and make input/output decisions to perform a sequence of steps for a test flow. The ML system 100 can be trained to address long sequences of dependent actions and verifications, basic tasks (e.g., Login, Search, Create Account, Add Items to Cart, etc.).

Figure 2:
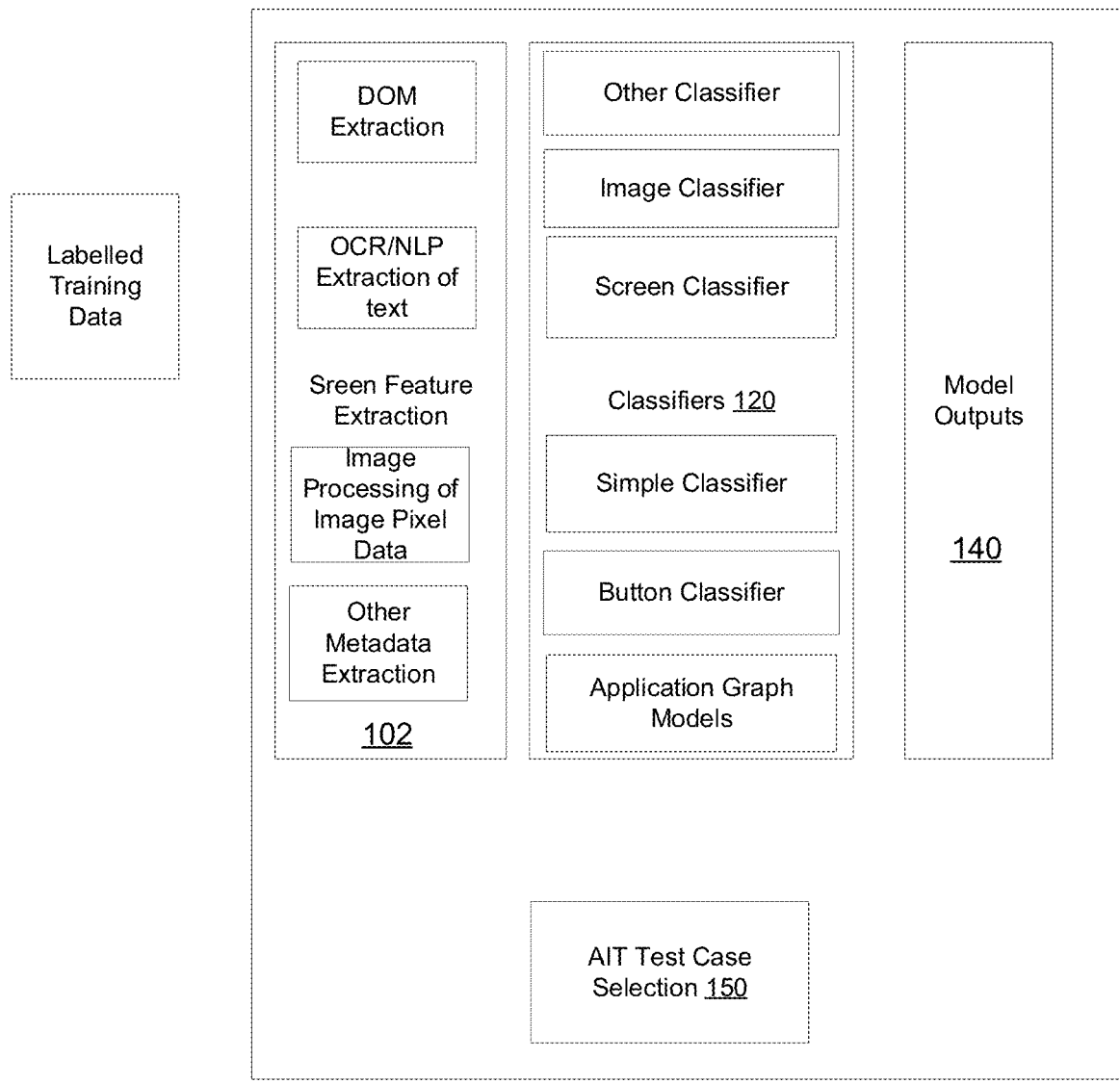
FIG. 2 illustrates aspects of feature extraction and classification of a software testing system in accordance with an embodiment.

FIG. 2 illustrates an example of the ML system 100, according to an embodiment, in which the screen feature extraction 102 includes DOM extraction, Optical Character Recognition (OCR)/Natural Language Processing (NLP) to extract relevant text, image processing of image pixel data, and metadata extraction. In this example, the classifiers 120 include an image classifier, a screen classifier, a button classifier, and other optional classifiers. However, more generally, variations in the numbers and types of classifiers may be utilized. Classifiers may also be provided to identify navigation pathways based on the application graph model.

In one embodiment, a trained classifier classifies elements based on features. For example, an individual screen may have a large number of attributes that are detectable as screen features. For example, an individual screen may have hundreds of possible features if all of the potential data associated with a screen user interface is considered.

In one embodiment, a screen element generally corresponds to a combination of features that are correlated to what a human user would interact with in terms of a visual display of a user interface. For example, a screen element may have a correlation with GUI structural elements or GUI interaction elements used to visually represent information for human users.

In one embodiment, the elements of the screen are categorized into element types. For each group of elements, the level that that occurs in the DOM hierarchy may be recorded. In one embodiment, the classifier also classifies contextual features, such as counting the number of elements that have text that is significant to a set of terms.

Some examples of features include basic characteristics of a screen, such as x, y, width, height, ratio, checkable checked, clickable, scrollable, focused, focusable, long-clickable, password, selected, instance, resource-id, text length, dominant color (red, green, or blue). Another example includes button, imageview, input, layout, rating-bar, scrollview, selectable, tab, textview, view, webview.

In one embodiment an element type is determined based at least in part on text that is significant to selected terms (e.g., "shop"). For example, the text may be text significant to a shopping app (e.g., "shop," "add to cart").

In one embodiment, the visual features of a screen include a set of pixel intensity values for each pixel and color components (e.g., RGB) or the screens dominant color. The screen can be further classified into structural features.

In one embodiment, elements are classified based, at least in part, off of image data. Optical character recognition may be used to parse pixels as text. The text, in turn, may be used to help classification. Additionally, the machine learning system may be trained to recognize images (e.g., recognize a shopping cart by training the machine learning system with training data including many different versions of shopping carts).

Figure 3:
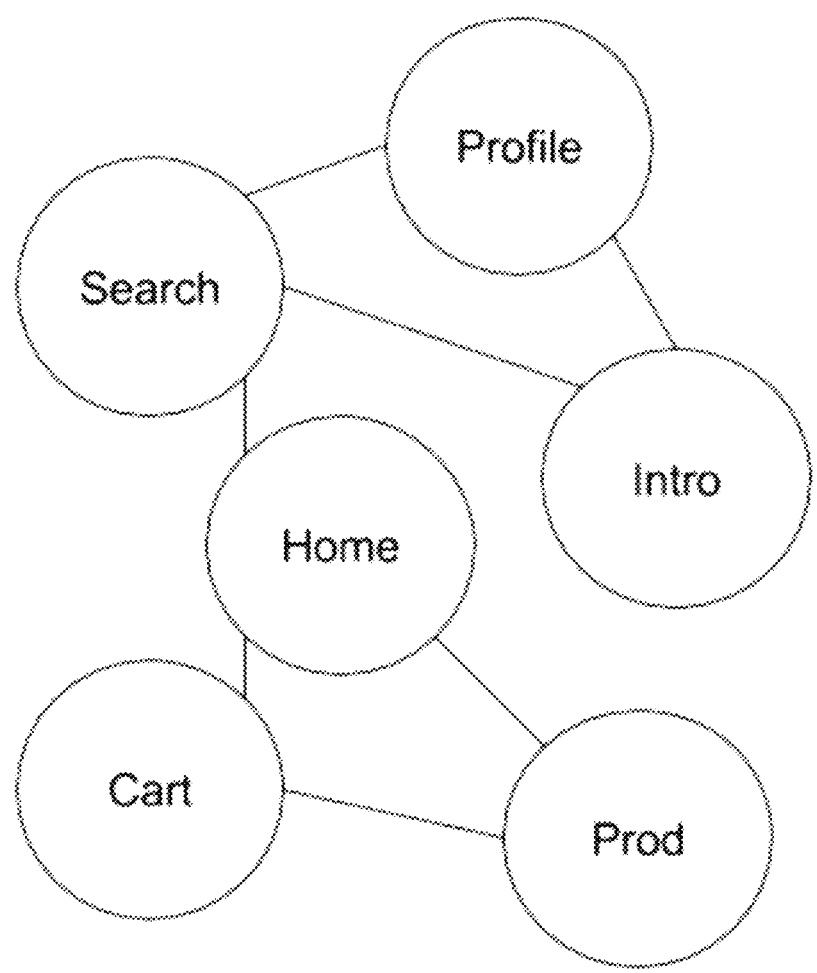
FIG. 3 illustrates an example of an application graph in accordance with an embodiment.

FIG. 3 illustrates an example of an application graph for an app in accordance with an embodiment. Each screen state corresponds to a screen state that is a node represented by a circle in the application graph. In this example, the application graph has nodes representing a set of common screen types, such as a profile screen, intro screen, product screen, cart screen, home screen, and search screen. More generally, an arbitrary number of different screen types may be included in an application graph that has a set of nodes in a logical state graph. The connections between each node in the application graph show permissible direct transitions from one node in the logical state graph to another. The ML system is trained, using training data and training apps, to recognize states corresponding to an application graph of an app, as described below in more detail.

In one embodiment, the ML system 100 is trained based on training data to learn common states and common interactions of node of application graphs. For example, many apps have screens performing the same logical function (e.g., shopping, search, checkout, etc.) and similar ways of navigating from one screen type to another. As described below in more detail, the training may include training the ML system 100 to identify the screen type the application is currently in and navigate to another screen state. That is, the ML system 100 is trained to recognize screen states corresponding to common screen states in application graphs for categories of applications.

Figure 4:
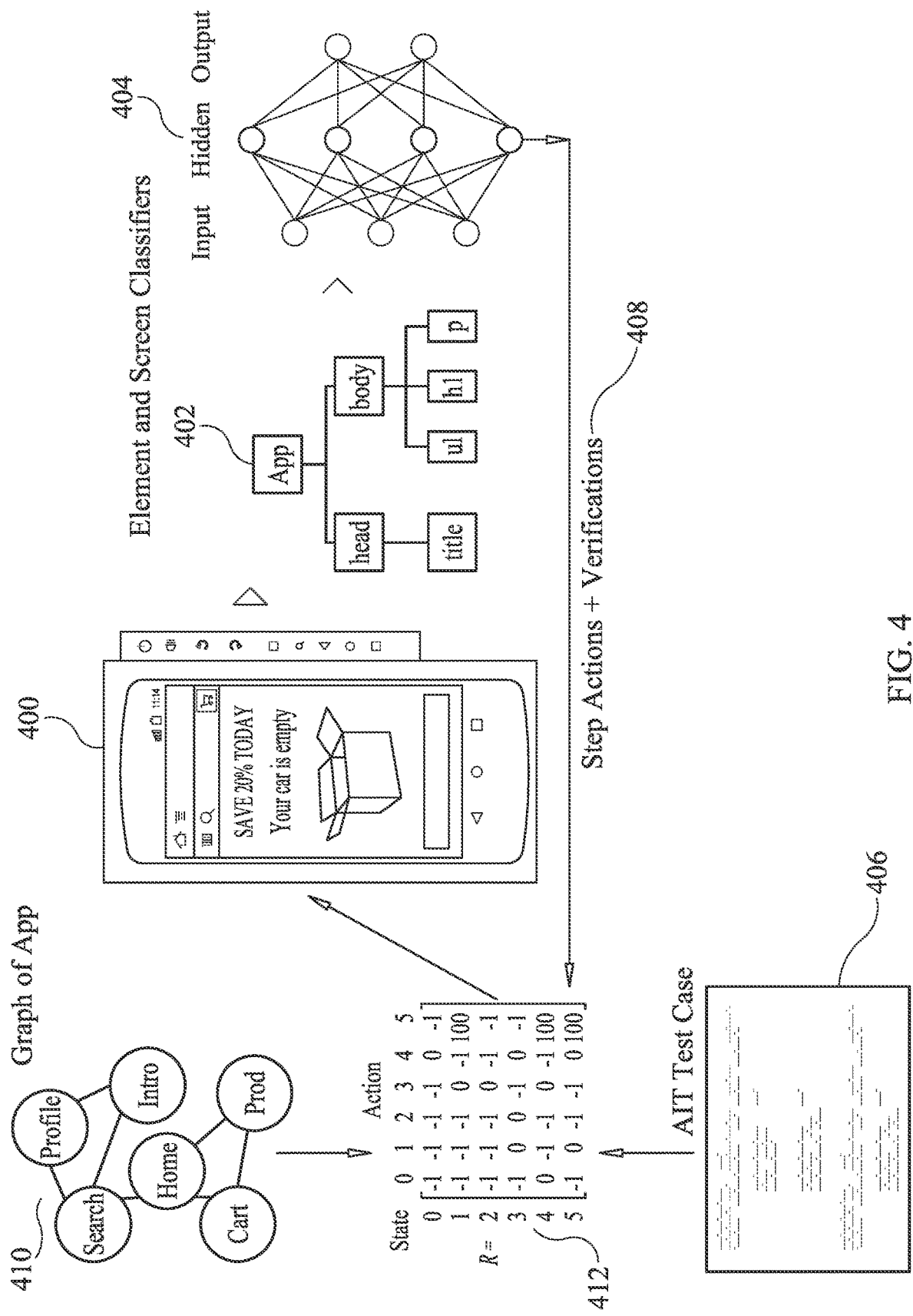
FIG. 4 illustrates an example using element and screen classifiers in a machine learning model to determine stepping actions and verifications for AI test cases selected based in part on an application state in accordance with an embodiment.

FIG. 4 illustrates an example of an embodiment in which an application 400 (e.g., a mobile application generating screens for a mobile device display) has screen features that the trained ML model 404 uses to determine actions and verifications 408 for the app. In this example, an AI test case 406 is determined based, at least in part, on the screen state.

In the middle is shown a mobile device app 400 generating a display of a screen (on a mobile device for the purposes of illustration). The features 402 of the screen are extracted and input to the ML model 404 (represented on the far right by an input layer, hidden layer, and output layer). The ML system steps the actions and verifications 408 for the app. This stepping takes into account that the ML system has learned common application graphs 410 and can select actions based on the application graph state, including navigating to a desired screen to implement a test flow. In one embodiment, matrices 412 represent the result of ML training to generate information to select an action to move to a desired screen state.

In some implementations, the test case is selected based at least in part on the application graph state. The testing process of an app may include the ML system navigating through the app, stepping actions, and making verifications. As described below in more detail, the training of the ML system to learn how to navigate between common nodes in an application graph. This may be used by the trained ML system during a test flow to navigate to a particular application graph state. For example, a test flow may have an intent to navigate to a particular application graph state, such as: "navigate to cart."

In one implementation, the ML system 100 includes initial training and ongoing training, which may include using feedback from testing multiple software apps. As a result, after an initial phase of training, the ML system 100 can learn from testing different applications ("cross application"). Moreover, the ML system 100 can learn from testing apps executing on different platforms ("cross platform"). This permits the ML system 100, over time, to learn similarities in how different categories of software apps perform from cross application and cross platform training.

In one implementation, the intelligent bots are trained to analyze screens, elements, and flow of apps. The intelligent bots may also be used to measure performance and track the user experience.

In one embodiment, canonical test cases are defined. In one implementation, for common apps, such as shopping apps, a canonical set of nodes may be defined corresponding to a graph. Delta changes can be found based on canonical edge cases and a system delta. Many different apps present UI screens that share similar element and screen types. This permits AI/ML to benefit from learning from multiple applications. In one embodiment, transfer learning is utilized to apply learnings from one app to another. For example, shopping apps tend to have similar behavior in terms of possible sequence test flows navigating to a purchase screen, a cart screen, a checkout screen, etc.

There is thus an ability to learn app behavior from multiple apps and reuse it for a specific test case. For example, app behavior of a shopping app may be reused for a specific test case of a particular shopping app. For common classes of apps, such as shopping apps, a canonical set of labels/nodes may be defined that correspond to a nodal graph. Additionally, a delta (difference) may be detected based on canonical edge cases and a system delta.

In one implementation, the system performs performance management. The performance can be monitored by looking at UI experiences including time for links to stabilize. This makes the performance monitoring similar to an end user experience. In another embodiment, performance benchmarks are generated, as described below in more detail.

In one embodiment, a user interface is provided to aid in testing a UI, tagging elements with labels, and playback.

In one embodiment, there is learning of tests cross application. In one embodiment, general data from multiple cases (e.g., multiple different shopping applications) is used to provide data from the multiple cases to bump confidence levels in making decisions regarding testing an individual app.

One aspect of using AI/ML is that it provides the following benefits:
1) Robustness
2) No need to write code
3) Scalability
4) Continuous learning of multiple apps
5) Faster implementation speed Additional examples and details are provided below.

Automatic Test Determination

In one embodiment, the machine learning system starts with a specific test case that it attempts to execute. However, more generally the machine learning system may automatically determine tests to execute.

In one embodiment, the test cases are based on a current screen type and can include searching for bugs on individual screens. However, more generally, application performance also includes the efficiency with which a human user can navigate from one screen to another or to a different screen. In one embodiment, the test cases can include testing how well the app supports navigation between different screens, such as navigation from a selected screen type to a different screen type. For example, the test case can include a "navigation test step type," which is a more general declarative type that consists of one or more screen transitions. Example: "navigate to the shopping cart screen."

In one embodiment, the ML system 100 determines tests to execute for an app. In one embodiment a bot, when it is crawling/exploring an app, starts looking for tests it can execute. In one embodiment, it determines a test to execute based at least in part on a screen state determined from classification of a visual icon or visual image on a screen. For example, if a bot of the ML system 100 sees a search icon, the bot clicks it and starts inputting text strings to search in the app. In one embodiment, a test report is generated of all the tests the ML system 100 found and executed.

One of the issues that arises in testing software applications is training the ML system 100 to select test cases to run. In one embodiment an ML system 100 is trained to have bots that crawl screens of an application, use classifiers (or other techniques) to identify different screen image objects, and select from different test cases to run from a library of test cases.

As an illustrative example, in one embodiment, the ML system 100 starts by first analyzing a screen using classifiers to determine:
1) What screen the app is on (e.g., sign in, checkout, shopping cart, etc.)
2) What each element on the screen is (e.g., element 1 is a logo, element 2 is shopping cart, etc.)

Using this information, the ML system 100 determines the available tests to run. In one embodiment, it does this by keeping a library of available tests it can run, and has run in this cycle, and chooses a test that is available for the given screen and elements that it hasn't run before.

For example: If there are at least these 2 tests known:
"search for jeans" Click the search_box, type jeans, hit enter "Verify cart button takes you to shopping cart"—Click the cart_button, verify in shopping_cart If the ML system 100 determines the screen contains both a "search_box" and "cart_button" element on the screen then it will know it can run 2 possible tests and heuristically decide between the two. If it has previously run the "search for jeans" test then it will always choose the "verify cart button" test. If it's previously run both, it will take an action and continue searching for additional tests to execute.

Cross Application and Cross Platform

Embodiments include using the machine learning system to test different applications cross application and cross platform. Many categories of applications have similar screen types and screen elements. Thus, in some embodiments the machine learning system is trained using a variety of different training applications and feedback is provided for ongoing training so that the machine learning system learns from different applications such that there is cross application learning. This cross application learning supports identifying similarities with different application and forming comparisons.

In one implementation, cross platform reuse is supported using a conversion layer or a conversion table to handle different platforms. For example, different mobile device platforms, such as Android and iOS, have different formats. Different mobile devices can have different screen resolutions and placements. For example, a conversion table may be used to recognize buttons on different platforms. More generally, minor differences in screen element appearance and formatting due on different platforms may be accounted for using a conversion layer. Additionally, the cross platform reuse can include using a conversion table/layer to handle other potential sources of differences in screen element appearance and formatting, such as between mobile and web implementations. In one embodiment, comparisons are also generated for executing apps on different platforms.

In one embodiment, cross platform operation is supported by working at a common abstract level, working at the lowest levels of the stack, and identify elements at the abstract level, not lower levels. In one embodiment, cross platform operation is facilitated by performing element identification using computer vision. For example, by performing image classification of the visual appearance of images on a screen, many images will be similar on different platforms but with minor differences in appearance. Using image classification helps to support cross-platform operation. In one embodiment, cross platform operation is further supported by providing per-platform classifiers to support platform differences that cannot be accounted for by a conversion layer or conversion table.

In one embodiment, image classification is used, at least in part, to generate element information. This also aids in supporting cross-platform operation.

In one embodiment, element classification is transferred across platforms.

An example of cross platform operation of the machine learning system includes the following steps:
1) crawling through a software application;
2) utilizing a set of classifiers trained to identify at least one of screen types and screen elements of screens;
3) identify test cases based on the identified screen types and screen elements;
4) applying a conversion layer or a conversion table to adjust for differences in screen element appearance and formatting on different platforms;

5) applying the identified test cases to the software application; and 6) reporting test results for the software application.

In one embodiment, the machine learning system converts a screen source to an abstract layer common to a plurality of different platforms, and performing image analysis to extract element information for the plurality of different platforms. In one implementation, the classification includes at least one image classification to classify images on a screen for different platforms and/or different applications. That is the ML system may be trained to recognize images, such as shopping carts, for different applications and platforms.

As another example, a method of training the machine learning system includes:

1) training a machine learning model to crawl software applications;

2) training the machine learning model to identify screen types and screen elements of the software applications including:

adjusting for differences in screen element appearance and formatting in different platforms; and training an image classifier to detect attributes of screens and screen elements;

applying test cases based on the detected attributes; and reporting test results for the software application.

In one embodiment, the attributes comprise a nodal graph state and the training further includes identifying a state of the nodal graph state based on attributes associated with a screen. In one implementation the nodal graph state comprises at least one of a shopping cart screen, a login screen, a sign in screen, and a checkout screen. In one implementation, the machine learning system is trained to learn from testing different applications to identify similarities between software applications on different platforms. In one implementation, the machine learning system is trained to learn from different applications and compare performance of different applications. In some embodiments, the performance comparison is cross application, although the performance comparison may also be cross platform.

ML Training Overview

In one embodiment, the ML system 100 is trained to recognize different screens and the states of an application. For example, an app may have screens and an associated application "state" for screens such as a "login screen", "search results screen", "permission dialog", etc. In one embodiment, the machine learning system is trained based on many thousands of screenshots of real-world application. In a training phase, the machine learning system is trained to understand classes of UI states that applications have. This training benefits from the fact that there are some commonly used app states, such as those for login screens or shopping carts.

Figure 5B:
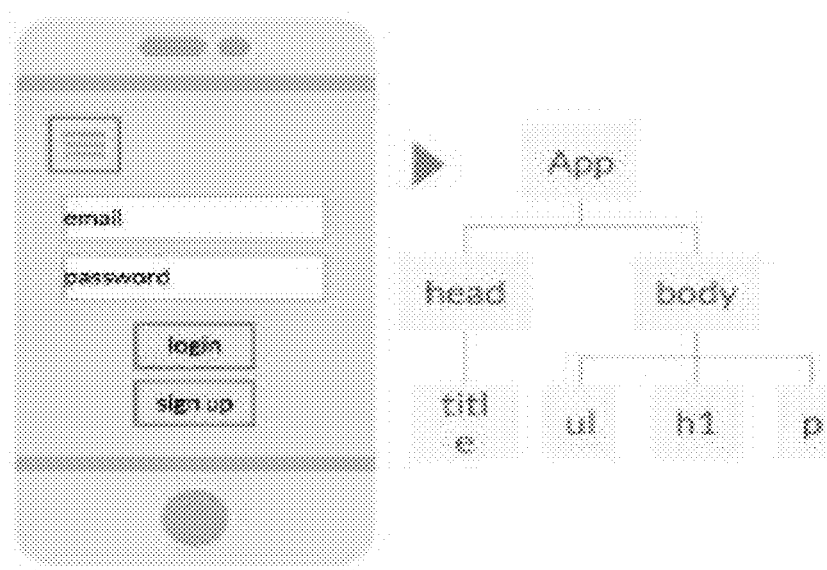
FIG. 5B illustrates a user interface screen having associated feature characteristics in accordance with an embodiment.
Figure 5C:
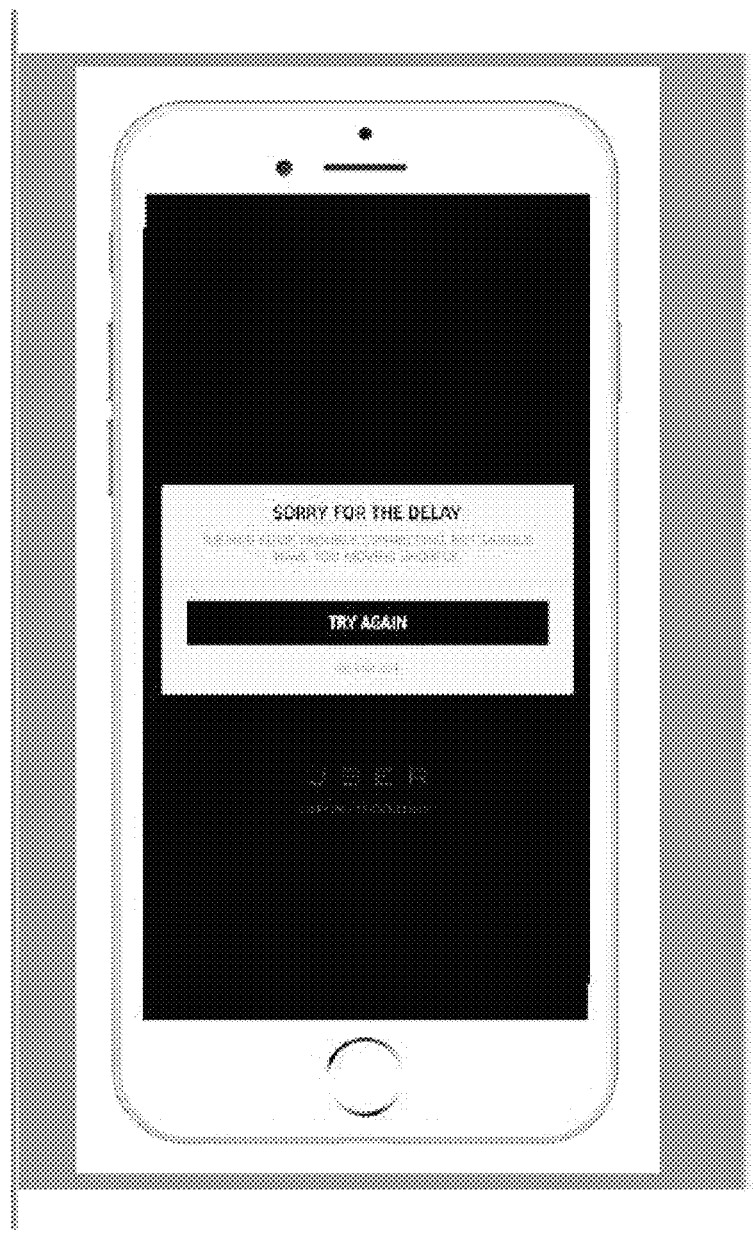
FIG. 5C illustrates an example of a user interface displaying a "try again" message in accordance with an embodiment.

In one embodiment, a user interface is provided to support training labels, elements, paths, and screens. Referring to FIG. 5A, in one embodiment, the training includes a labelling step in which human users apply labels to each screen during training. For example, FIG. 5A shows a mobile device screen 505 asking whether a user would like to receive a notification, such as a check-in notification, and a labelling interface is shown in 510 for a human user to select a label for the screen. In this example, a set of user label categories is provided for a human user to select a category for the screen. For example, a human user may execute test applications and manually crawl through the test applications and labelling screens. FIG. 5B shows an example of a mobile device displaying a login screen and some of the corresponding screen features. FIG. 5C illustrates an example in which a screen displays a "sorry try again" message.

As one illustrative (but non-limiting) example, a labelling system includes labels for common screen types, such as an intro/welcome screen, a login/signup screen, a privacy policy/terms and conditions screen, a home screen, a site menu screen, and a popup screen. More generally, the labelling user interface may include an arbitrary number of different labels for human users to label screens by clicking the appropriate labels for each screen in sequence. In one embodiment, the user interface for the labelling system supports labels for labelling elements, paths, and screens.

A result of the training is that once all of the labels are saved, there is a body of labelled data with which to train the ML system 100. In one embodiment, the trained ML system 100 is trained to accept a screenshot and a summary of the DOM of an application and determine the correct label. Thus, for example, after training the ML system 100 recognizes common screen types for apps.

Figure 6:
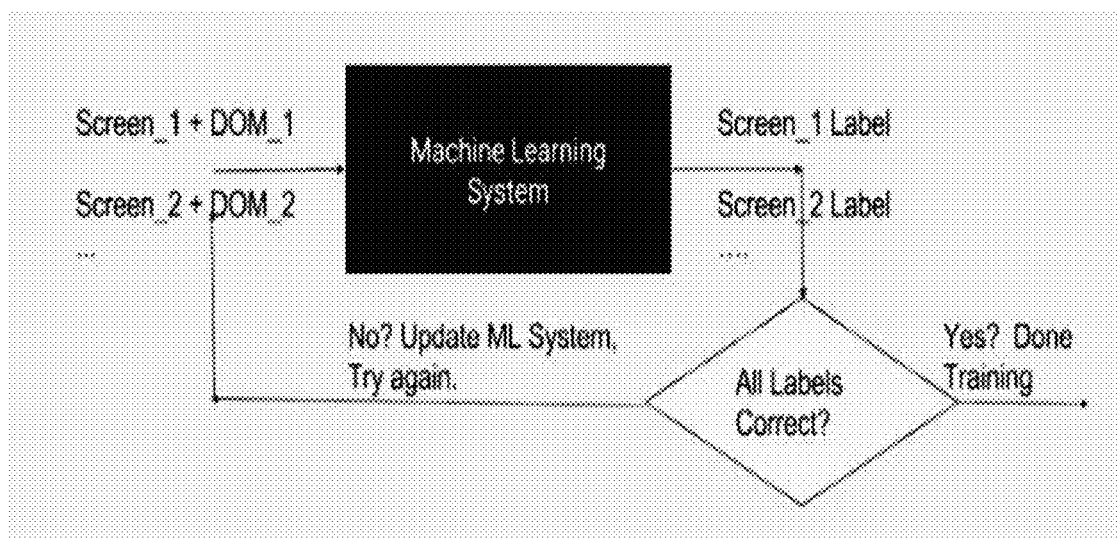
FIG. 6 is a flow chart illustrating training of a ML system in accordance with an embodiment.

FIG. 6 illustrates training the Machine Learning System, using the labelled training data until the ML system 100 can determine, within a desired confidence/error level, screen states/types.

The ML system 100 is further trained how to decide on correct input actions to take based on what screen state the application is in, and other element information. An individual action is a pair of an "element" and an "input." As an illustrative example, an element can be a button (e. g, an OK button) and an input could be a "tap" or a "swipe." As another example, an element could be a search text box and the action could be entering search text (e.g., "beanie babies" as a product search).

As some examples, during training the inputs and outputs may include:

Input Training Data: ['screen_label': 'search', 'elements': 'button, textbox, image']

Output Training Data: ['textbox': 'enter_text', 'button': 'tap', . . . }

In one embodiment, the training of individual actions is based on providing training data in which screen context and specific elements are shown to the machine learning system. In one embodiment, the ML training results in trained ML system 100 generating bots (autonomous agents) to crawl an app, determine a screen state, and interact with the app, including selecting test cases to run. While bots are an illustrative example, more generally the training results in a trained machine learning model to test software apps. And while there is an initial training phase, it will be understood that ongoing feedback from testing software apps may be used to provide ongoing training.

One advantage of the ML system 100 determining the screen state is that it greatly reduces the number of paths compared with a random walk crawler. As an illustrative example, if an average screen has 150 pairs of plausible element/action pairs, the number of potential branches expand quickly to huge numbers to test all different paths. In contrast, training the ML system 100 to determine a screen state permits a pruning of the state space.

In one embodiment, during testing of a new app, the ML system 100 may include a bootstrap application to launch the app in a simulator or a device. In this embodiment, the ML system 100 takes a screenshot of the app (for each screen) and downloads the current DOM over a debug connection to the app. For example, some automation components and utilities have commands to get the DOM and other commands to get a screenshot. Based on the visual content of the screenshot and the DOM, the ML system 100 makes a decision for an output that is a pair of element and action names. In one embodiment, an application driver identifies an element's location or handle on the screen and, based on the recommended action, sends the appropriate tap, swipe, or text input.

Figure 7:
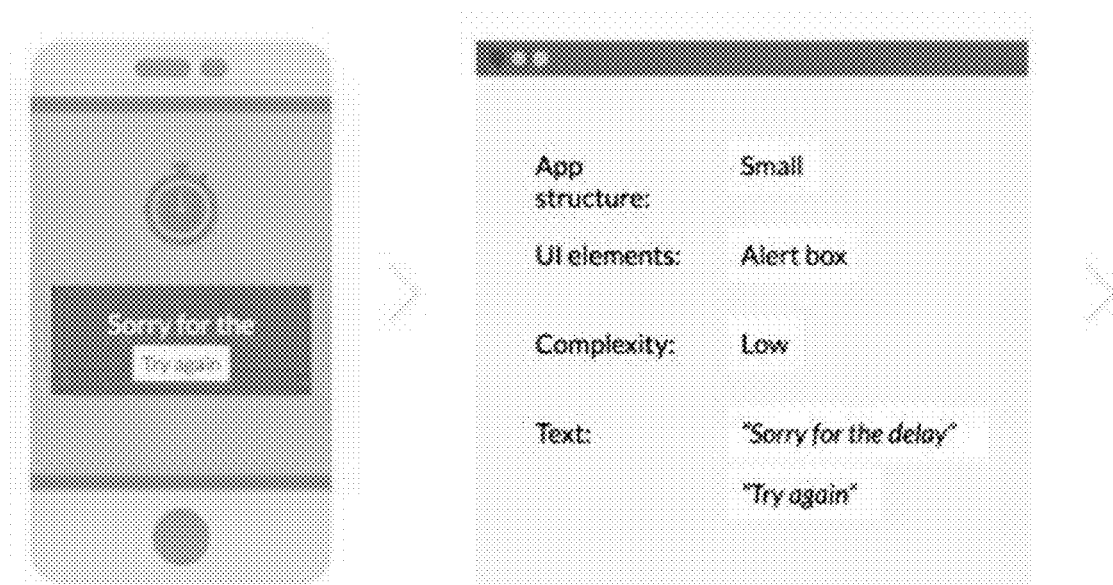
FIG. 7 illustrates an example in which text information and other screen information is used to identify a bug in accordance with an embodiment.

In one embodiment, the ML system 100 training includes training the ML system 100 on examples of bugs to detect bugs. The ML system 100 may also be trained to automatically check for common, detectable issues, such as application crashes, error dialogs, etc. For example, based on training data for previous bugs, the ML system 100 may be trained to auto classify a next screen in a sequence as a bug. Other examples include training the ML system 100 to learn that screens having few DOM elements, or screens having strings such as "sorry" "oops" or "try again" are likely bugs in the app. FIG. 7 illustrates an example in which a screen displays "sorry" and "try again" on the display in the left portion of the figure. The right portion of the figure shows some of the screen attributes. The text provides one indication for a bug, but other screen attributes, such as low complexity, an alert box, and a small app structure are also indicative of a bug.

In some embodiments, the ML system 100 is trained to record every screenshot, DOM, and action sequence taken in a test run through an app. Human users then verify whether the sequences pass or fail. In some embodiments, human users review new behavior of function of the trained ML system 100 for correctness, which in turn is use to further train the ML system 100.

However, more generally, the ML system 100 may be trained to identify flows and performance issues, such as a number of steps to perform a particular action, such as navigating to a shopping screen, making a selection, and checking out.

Figure 8A:
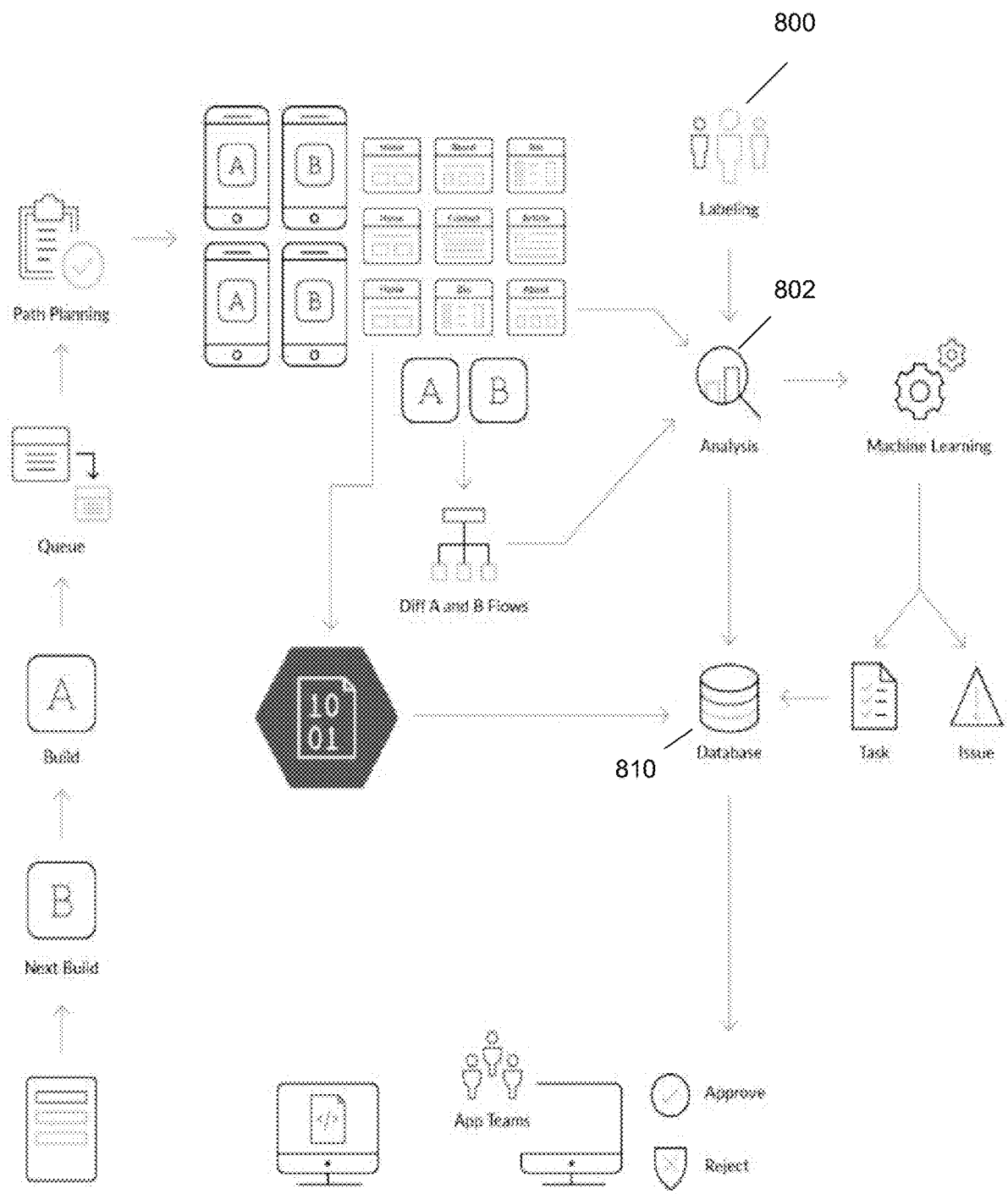
FIG. 8A illustrates aspects of a method of generating training data and testing software apps in accordance with an embodiment.

FIG. 8A is a high-level figure showing some additional aspects of labelling. Human labelers 800 contribute to an analysis 802 that also includes inputs from diff flows. The analysis 802 is used by the machine learning system. A database 810 stores the analysis data and other data such as task/issue outputs from the machine learning system. A database stores data, including diff flows, labelling data, task data from the ML system, and other data. The process of testing and learning may continue over a sequence of builds, as indicated on the far left.

Figure 8B:
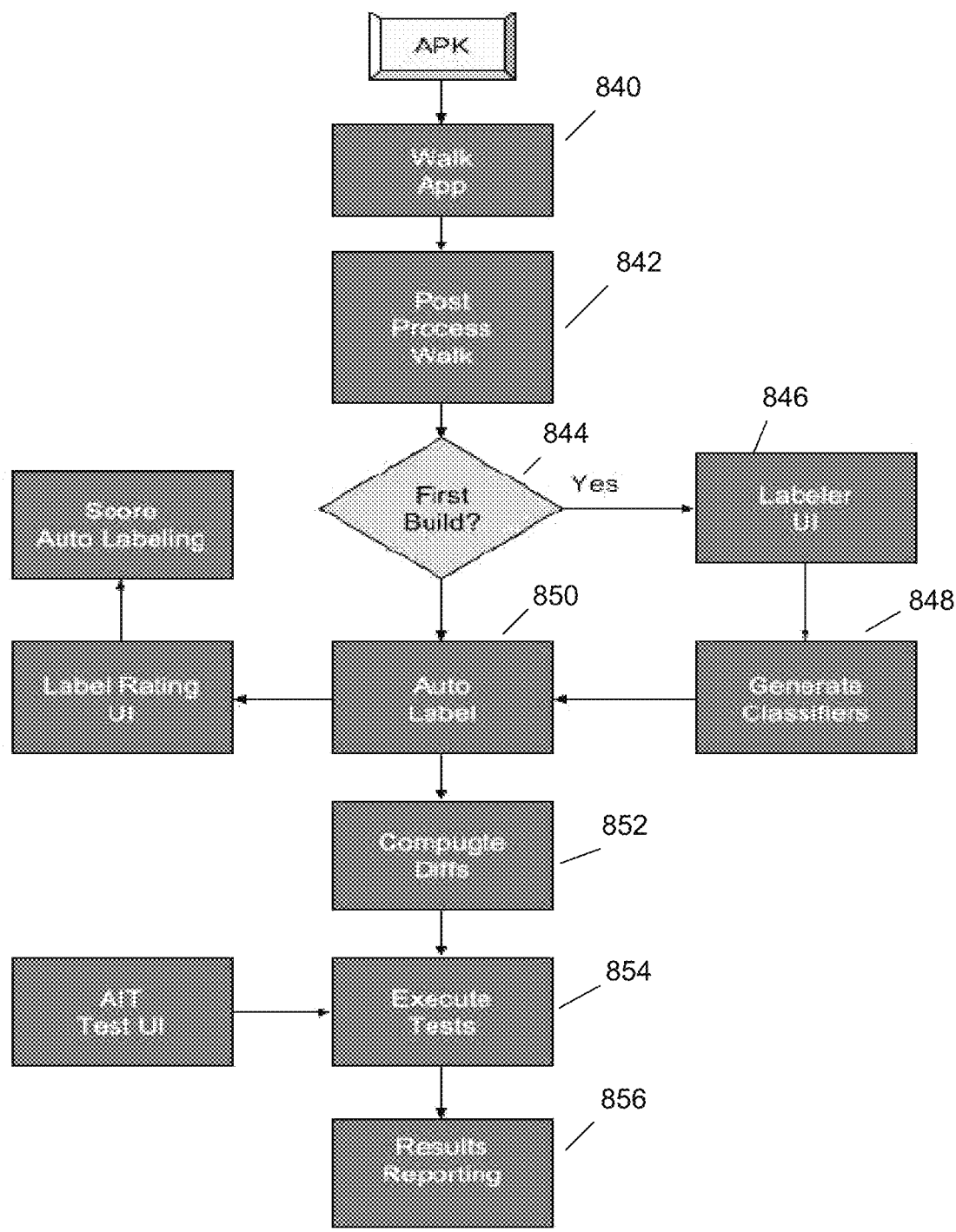
FIG. 8B is a flow chart of a method of testing software in accordance with an embodiment.

FIG. 8B is a flow chart illustrating a method of operating the trained ML system in accordance with an embodiment in which there are exploratory test and training phases. In one implementation, an APK file extension interface that permits crawling 840 through an app. Post processing 842 is performed. A determination is made 844 whether there is a first build. For a first build, a labeler UI 846 is initiated to generate classifiers 848. After a first build, auto-labeling 850 is performed, followed by computing diffs 852, executing tests 854, and reporting results 856.

Minibrain Training and Q-Learning

In some embodiments, the ML system 100 is trained with sub-units of a larger software application nodal graph. The training results in the ML system 100 having what is, in effect, bots that are specialized to know how to navigate between sub-sections of a larger application nodal graph. These sub-sections are subgraphs in the sense that each subgraph contains a subset of nodes and a subset of edges. This may be described as forming sub-brains or mini-brains that are trained to find paths between specific screen states/types. For example, one mini-brain may be trained with subgraphs of a larger application nodal graph to navigate between a shopping cart screen to a home-screen.

Figure 9:
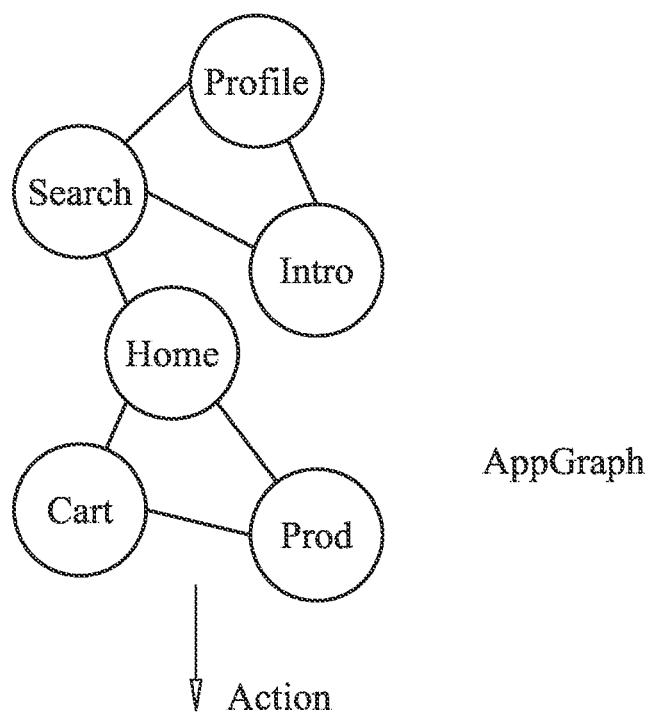
FIG. 9 illustrates a method of using Q-learning to generate a matrix to determine actions to navigate to a selected app state.

As an example, rewards may be provided for finding a particular screen, such as a shopping cart screen. For example, to train the ML system to navigate to a shopping cart, steps that don't find the shopping cart are penalized. The Q-learning process is iterated many times over many different applications (e.g., 10 k×N Apps). The result of performing Q-learning multiple times over a number of different apps is that a Q-learning matrix that represents the intuition of how to get to a desired state (e.g., a shopping cart screen or other screen). For example, referring to FIG. 9, supposes a set of six different screen types (cart, home, product information, intro, search, and profile) are represented as six different states 0, 1, 2, 3, 4, and 5. Suppose that the cart state corresponds to state 3. Q-learning would then be performed to train the ML system to navigate to state 3. The result of Q-learning is a matrix that represents the intuition of how to get to shopping carts. That is, the matrix generated from the Q-learning may be used by the ML system to determine a step likely be productive in navigating to a shopping cart screen from other common screens. But more generally, Q-learning may be performed to generate matrices for navigating to other screens, such as the search screen.

As one example, Q-learning may be used to reward a mini-brain to find a path to a home-screen from other screens. More generally, Q-learning may be used to reward other types of screen navigation.

While Q-learning to find a particular screen is one example, more generally the training of mini-brains can be thought of training the ML system to navigate over a subset of the nodes of the application graph instead of over an entire sequence. In theory, a ML system 100 could be trained to analyze an entire sequence of transitions over nodes of an application graph. An application can be represented as an application graph that is an abstract node graph of application, moving from one screen to another. However, an individual application could have a large number of screens.

As a result, a change to an application can break the sequence. In one implementation, instead of training a single ML brain for the entire sequence of all possible node transitions, the ML system 100 is trained to generate a set of sub-brains trained to traverse a smaller section of the application graph corresponding to a subgraph. In one embodiment, each sub-brain is trained to traverse between only a small number of nodes. In one implementation, each sub-brain is trained to move from one screen to another (i.e., from one node in the graph to another node, such as Node A to Node B). In the extreme case, a sub-brain is trained to perform a single navigation operation, such as navigating to the cart.

Using a set of mini-brains trained to move between a small number of nodes makes the system more robust to changes in an app. As an illustrative example, suppose that a software application has twenty different screen types in nodal graph representation. There are implicitly certain connections between nodal graph states. For example, an individual node, N, in the nodal graph may be directly connected to a number, $M_n$, of other nodes. For example, a shopping cart screen may have a connection with a checkout screen but not a profile screen. Small changes in the nodal graph structure may occur, such as additions or deletions of some individual connections or nodes. Training a ML system 100 to learn entire sequences for a large number of nodes, N is not as robust to changes in the software application as training mini-brains to learn how to navigate small portions of the nodal graph.

In some embodiments, canonical sub graphs are generated for common app states. In some embodiment, the ML system 100 has sub-systems (individual "brains") with bots trained to perform one step moving from one step to another in a sub-graph of application node graph, such as moving from one screen to the home screen. In one embodiment, an exemplary machine learning method includes:

1) crawling through screens of a software application;
2) for each screen, determining a nodal graph state associated with the screen from a set of at least two different nodal graph states, and
3) in response to the determined nodal graph state, selecting a machine learning model trained to learn a sub-graph of an application graph associated with the determined nodal graph state.

In one embodiment, each selected machine learning model is trained to explore what corresponds to a sub-graph of the nodal graph. The sub-graph includes at least two nodes (a starting node and at least one possible destination node directly connected to the starting node), but could correspond to a sub-graph representing some commonly connected sets of nodes (e.g., shopping cart screen, checkout screen, and products search screen).

The exemplary method may further include navigating the software application based at least in part on selection of a machine learning model trained for determined nodal graph states. That is, each mini-brain allows the ML system 100 to explore sequences of operations, in terms of smaller sequences of operations corresponding to sub-graphs of the application node graph. This makes the ML system 100 robust to changes in a software application.

In one embodiment, the method further comprises reporting test results for the software application. In some embodiments, this includes selecting test cases to test the application. The testing can also include, in some embodiment, monitoring and reporting on a performance associate with sequences of steps. For example, a small change in a software app may result in bugs. But it may also result in a change in performance in regards to users exploring a software app through a sequence of screens.

Figure 10:
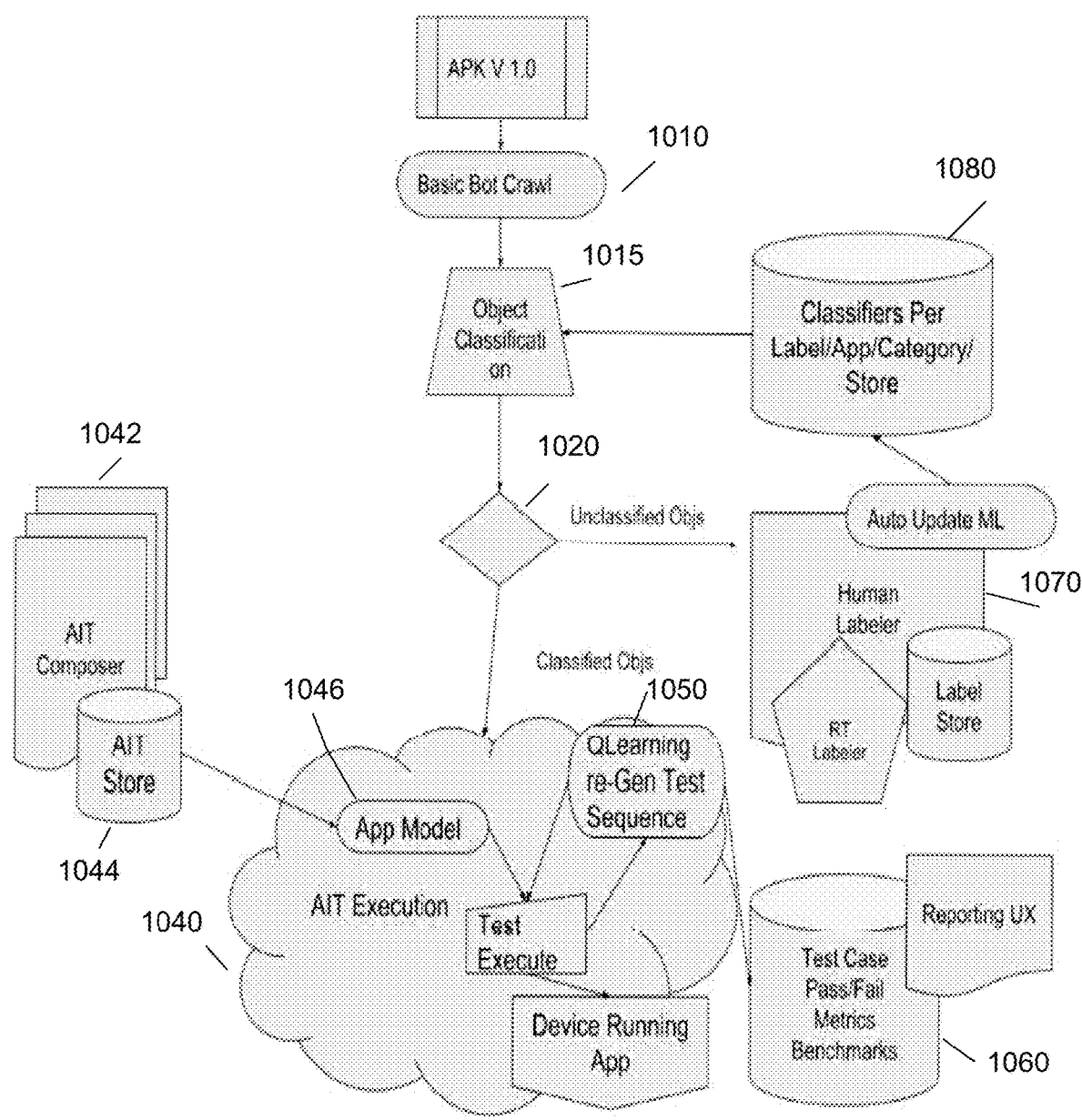
FIG. 10 illustrates aspects of a system for performing software testing in accordance with an embodiment.

FIG. 10 illustrates an example of training and operation with Q-learning in accordance with an embodiment. Bot crawling of an app is performed in block 1010. An initial object classification is performed in block 1015. AI test execution is performed in block 1040 (represented as a cloud to illustrate some interactions of different aspects of testing). In this example, the test execution 1040 references the Q-learning of test sequences 1050. Test execution may also step actions and verifications, as previously discussed. In one embodiment, a test composer 1042 and test store/library 1044 may be used to select tests for an app model 1046. In this example, test case metrics and benchmarks are also stored in a database 1060. In this example, the ML system also learns from applications. Human labelers 1070 aid the labelling if there are unclassified objects 1020 detected and this information is used to update the ML classifiers 1080. For example, as apps evolve and change their visual appearance of images such as shopping carts, human labelers can label unclassified objects and that information is used to update the ML system.

Training for Sequences and Abstract Intent

In one embodiment, the ML system 100 is trained to test specific test flow sequences of events with specific inputs, test long sequences of dependent actions and verifications, and perform basic tasks, such as login, search, create account, add to cart, etc. In some embodiments, this includes the previously described use of mini-brains and Q-learning to navigate to specific screen states (e.g., "navigate to cart").

This test methodology allows for repeatable app- and data-specific test input and validation. In one embodiment, an Artificial Intelligence Test (AIT) format methodology focuses on the abstract intent of a particular test case. That is, the I/O is not limited to exact steps or sequences in the application. Instead, in the execution of the ML testing bots 'find' a given labeled app state, interact with that screen's labeled element with a specific action. Part of the training, for example, includes training the ML system 100 to recognize elements in ways that are robust to changes in an application. This may include, as previously described, training the ML testing bots to navigate sub-graphs of a nodal graph. However, more generally, it may include training the ML bots to be robust to other changes in an app. For example, a shopping application may morph over time to change the color, appearance, and location of a shopping cart icon. Thus, one technique is to train the ML bots using many different examples of shopping carts so that the ML bots learn to identify images of shopping carts. While shopping carts are one example, more generally the ML training can be conducted to make the ML bots robust to changes to color, appearance, and location of images, text, fields, buttons, or other aspects of a screen and robust to changes in sequences of screens. Thus, the ML bots are trained to be robust to changes to the UI of the app and aspects of its flow.

In one embodiment, the approach to test case definition avoids one of the most common sources of test case maintenance pain, namely changes in an application's UI or flow. For example, traditional frameworks are sensitive to changes in the DOM structure and flow of an app as each test step must be executed in an exact sequence and it must find each element for each step of interaction based on specific element search criteria. With ML testing bots, the burden of finding the app state and input elements is left to the bot's ML classifiers from the label training, as described elsewhere in this application. If the application's flow changes, the bots can still search the state-space of the app to find the new flow and correctly label the state for data entry.

For example, in the case that an element for input has changed its location, size, color, parent-child relationship in the DOM, etc., the bots are trained on thousands of applications such that the bots can still identify the correct element for input despite severe morphing of the application. The ML bots are trained to know how to get to and from differently labeled portions of the application.

Additionally, training is performed to orchestrate the ML bots to execute very specific, named, test sequences with exacting input and output verification. There are three capabilities needed to execute these specific regression test cases:

1. Named sequences of steps.
2. Specific test input per app state
3. Verify specific app features or strings in a given state.

In one embodiment, to address the definition of test cases at this level of abstraction (labeled states and elements), a formal test case format is specifically designed for ML system 100 test execution. Traditional manual test cases that are loosely schematized collections of test case names, test steps, validations, and categorization metadata. Test automation test cases are often either encoded directly in a procedural coding language with very little structure, and/or represented in schemas similar to manual test cases in a formatted file, or formal Test Case Management System. As ML tests are able to execute on arbitrary applications, it is important to ensure that there is a declarative format that doesn't bind the test case logic to the specific application.

One embodiment of AIT test case definition borrows some general features from Gherkin, but has additional specificity in that it allows for the actions and verification steps to be sequenced, versus the unordered manner in Gherkin. An example instance is provided below.

Example AIT:
Demo AIT Test Definition
Test Name: Remove Beanie Baby from item from cart
Description: Make sure we can remove an item from the shopping cart.
Tags: cart, remove
Step: Search for Beanie Baby
Context: SCREENNAME "Search"
Input: ACTION SEARCH "Beanie Babies"
Step: Add Item
Context: SCREENNAME "Product" and HASWORD "Beanie Baby"
Input: ACTION ADDTOCART
Step: Remove Item
Context: Cart and HASWORD "Beanie Baby"
Input: Remove Item
Step: Verify Item Removed
Context: SCREENNAME Cart and NOTHASWORD "Beanie Baby"

Some additional examples are now described. In one embodiment, a method of testing software applications includes:

1) performing initial and on-going training at set of intelligent machine learning bots to: crawl through software applications having an associated logical state graph associated with a set of potential user interactions with a graphical user interface;

2) identify screen types and screen elements of the screens using a set of trained classifiers, including classifiers trained to analyze images representative of states of the logical state graph;

3) determine application states and a flow of sequences of states of the logical state graph;

4) identify test cases based on the identified screens types and screen elements;

5) apply the identified test cases to the software application; and 6) report test results for the software application.

In some embodiments, a deduplication is performed of common states in the application graph. In some embodiments, deduplication of elements is also performed. As an illustrative example, consider a process of deduplicating screens and creating a canonical app graph. As an illustrative example, an app could have a large number of different product details pages, such product details pages for shoes, dog food, cat food, potato chips, etc. In this example, the machine learning system 1) takes a large number of screens for different products, 2) reduces them to a single graph node "product detail," which has been labeled by the screen classifier, and 3) then reduces the number of edges both in and out of that node. This deduplication process results in a set reduction that improves efficiency of the machine learning testing process.

In one embodiment, the training comprises training a set of machine learning bots to name sequences of states, 2) test specific inputs per app state, and 3) verify specific app features or strings in a given state.

In one embodiment, the training comprises training the machine learning bots to find the application state and input elements from label training.

In one embodiment, the training comprising training on logical application graphs. In one embodiment, the training includes training on canonical logical application graphs and sub-graphs.

In one embodiment, the training comprises Q-learning training based on training data of real-world application usage.

In one embodiment, the training comprises cross-application graph training.

In one embodiment the training comprises training cross-application Q-learning.

As previously discussed, the machine learning system is trained to navigate between different screen types, such as navigating to a home screen. The ML system 100 can also test screen interactions based on a set of test cases selected based on the determined screen types and screen elements. Information on the sequence of screen transitions necessary to reproduce a test case may be recorded and used to produce a report. One example of testing an app using the machine learning system includes the system being trained to:

crawl a software application;

perform at least image classification of the visual appearance of a graphical user interface of the software application;

identify a set of user interface screen elements that can be interacted with by a user or a machine learning system;

determine screen types and screen elements of the graphical user interface of the software application;

determine various navigational paths that lead between two distinct screen types;

test screen interactions with the graphical user interface based on a set of test cases selected based on the determined screen types and screen elements;

produce a report that describes a sequence of screen transitions necessary to reproduce a test case.

In one implementation, the technique further includes the machine learning system being trained to generate a display profiling a performance of the software application; and compare test sequences executed in two or more different apps. In one implementation, the machine learning system is trained to identify a most probable element on a screen to interact with. In one embodiment, the display provides at least one of: 1) a comparison with a benchmark, 2) an identification of a similar software application based on a similarity test.

Benchmarking

In one embodiment, from each app test run, data such as performance, stability, and errors are collected, and associated with labels and application categories. As one example, benchmarks such as average login screen load time; reliability of apps in specific categories (e.g., shopping) may be collected. For example, if a thousand different apps are tested, then benchmarks may be generated comparing an individual app with other apps. Some examples of benchmarks include fastest screen, average screen, and slowest screen. In one embodiment, a similarity is identified between a test app and at least one other app. For example, in one embodiment the number of steps required for each test case is counted, and the total number amount of time to load each test case is measured to form performance comparisons in terms of the number of steps and load time. Other examples of benchmarks include the number of crashes. Some other examples of types of test comparisons to perform:

1-to-1 summary comparison of:
a. The same app running on iOS vs Android (different platforms)
b. The same app running on different test environments, including but not limited to device type, operating system, network type, geographic location, locale (language setting)
c. High level summary statistics showing number of testable flows, number of steps, aggregate performance summary statistics, stability metrics (launches, crashes), relative rankings vs each other across each variable 1-to-1 user flow detail comparison:
a. Quantitative (performance-based) user flow comparison of App A vs App B, such as Walmart login flow vs Target login flow
b. Visual summary comparisons of two user flows by showing actual rendered screenshots
c. Combined visual plus quantitative view showing user flow screenshots, overlaid with performance data and augmented with highlights of interaction areas Cohort summary comparison of:
a. App A performance and user flows compared to a collection of related apps; relations include category, publisher, platform, or customer-defined similarity
b. May also include comparative benchmarks vs the entire app store As an illustrative example, in one embodiment a set of intelligent machine learning bots are trained to:
1) crawl through a software application;
2) classify screen types and screen elements of the screens of a graphical user interface of the software application using a set of trained classifiers that includes at least an image classifier to classify visual features of at least one type of screen;
3) identify test cases based on the identified screen types and screen elements;
4) apply the identified test cases to the software application; and
5) compare a performance of the software application to a performance of at least one other application.

In this example method, the screen type may include a variety of different screen types such as a shopping cart screen, a login screen, a search screen, a checkout screen, and a sign-in screen. In one implementation, the comparison comprises comparing a number of steps required to perform a sequence of actions by a user. In one implementation, the comparison comprises identifying another related software application based on a similarity test. In one implementation the comparison comprises comparing the performance of the software application to a benchmark. In one embodiment, classification is also performed based on text extracted from the screens. In one implementation, training data is based on an initial set of training data that is updated with feedback from testing of different applications.

Illustrative Examples of Non-Game App Testing

As an illustrative but non-limiting example, the machine learning system may be trained to test software applications for non-game apps such as apps used by companies to provide information on goods or services offered by a company. There are vast numbers of such apps, such as apps to sell products, apps to provide services, and apps to provide information about companies.

In one implementation, a set of intelligent machine learning bots trained to:
crawl through a software application;
classify screen types and screen elements of the screens using a set of trained classifiers that includes an image classifier to classify visual features of a graphical user interface associated with at least one of a shopping cart screen, a login screen, a checkout screen, a product details screen, and a sign-in screen;
identify test cases based on the identified screen types and screen elements;
apply the identified test cases to the software application; and
report test results for the software application.

As another example, the machine learning system may include a set of intelligent machine learning bots trained to:
crawl through a software application;
perform a conversion operation to adjust for differences in a visual appearance and formatting of screen elements on graphical user interfaces of different platforms; and
classify screen elements on screens of the graphical user interface, including image classification of at least one of a shopping cart screen, a login screen, a checkout screen, and a sign-in screen;
identify test cases based on the identified screen types and screen elements;
apply the identified test cases to the software application; and
report test results for the software application.

Additional Examples

Figure 11:
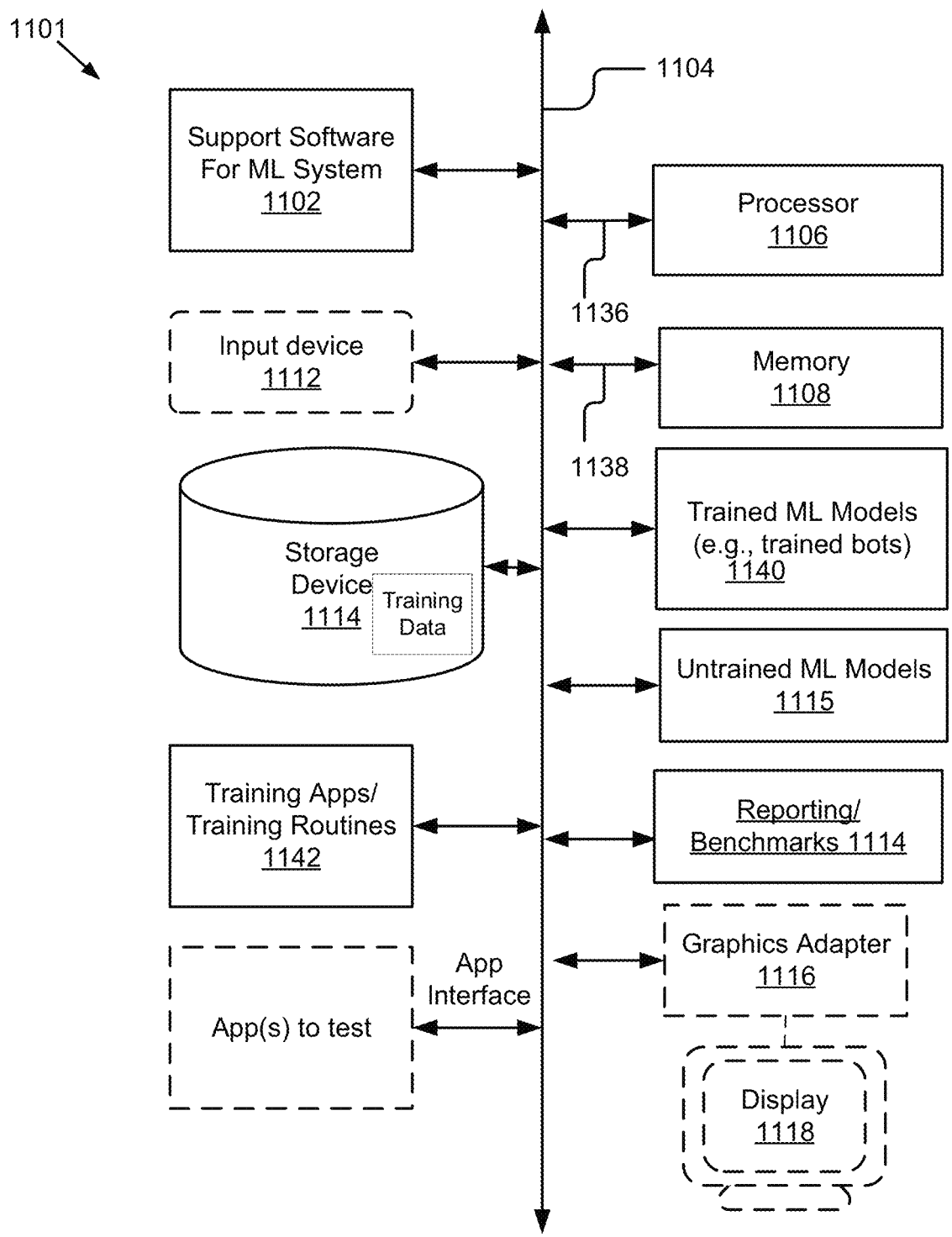
FIG. 11 illustrates an example of an implementation of a system in accordance with an embodiment.

The implementation of the ML system 100 may take different forms. Referring to FIG. 11, in one example, a machine learning system 1101 includes a processor 1106 that is coupled to a communication bus 1104 by a processor interface 1136. A memory 1108 is coupled to communication bus 1104 by a memory interface 1138.

Other components of ML system 1101 may be directly or indirectly communicatively coupled via communication bus 1104.

A storage device 1114 to store training data is communicatively coupled to communication bus 1104.

An input device 1112 may be provided for a user to enter inputs, such as inputs to perform labelling or other actions. A graphics adapter 1116 and a display 1118 may be used as output devices.

Other components may be implemented as computer program instructions stored on a non-transitory storage medium and executable on processor 1106 (or another processor). In one embodiment, module 1140 stores computer program instructions for trained ML models for the ML system. Module 1115 stores computer program instructions for untrained ML models. Module 1144 stores computer program instructions for reporting and benchmarking. Training apps and training routines are stored in module 1142. Other support software for the ML system 1102 may be stored in module 1102.

FIG. 11 merely illustrates one possible implementation for the purposes of illustration. More generally, different numbers of processors, storage devices, and modules to store different portions of the computer program instructions are possible. For the purposes of illustration, an app interface is shown for interface with apps to test, although in practice it would be understood that many different interfaces and/or techniques to interact with a software app during testing may be used besides those previously discussed in this application.

Figure 12:
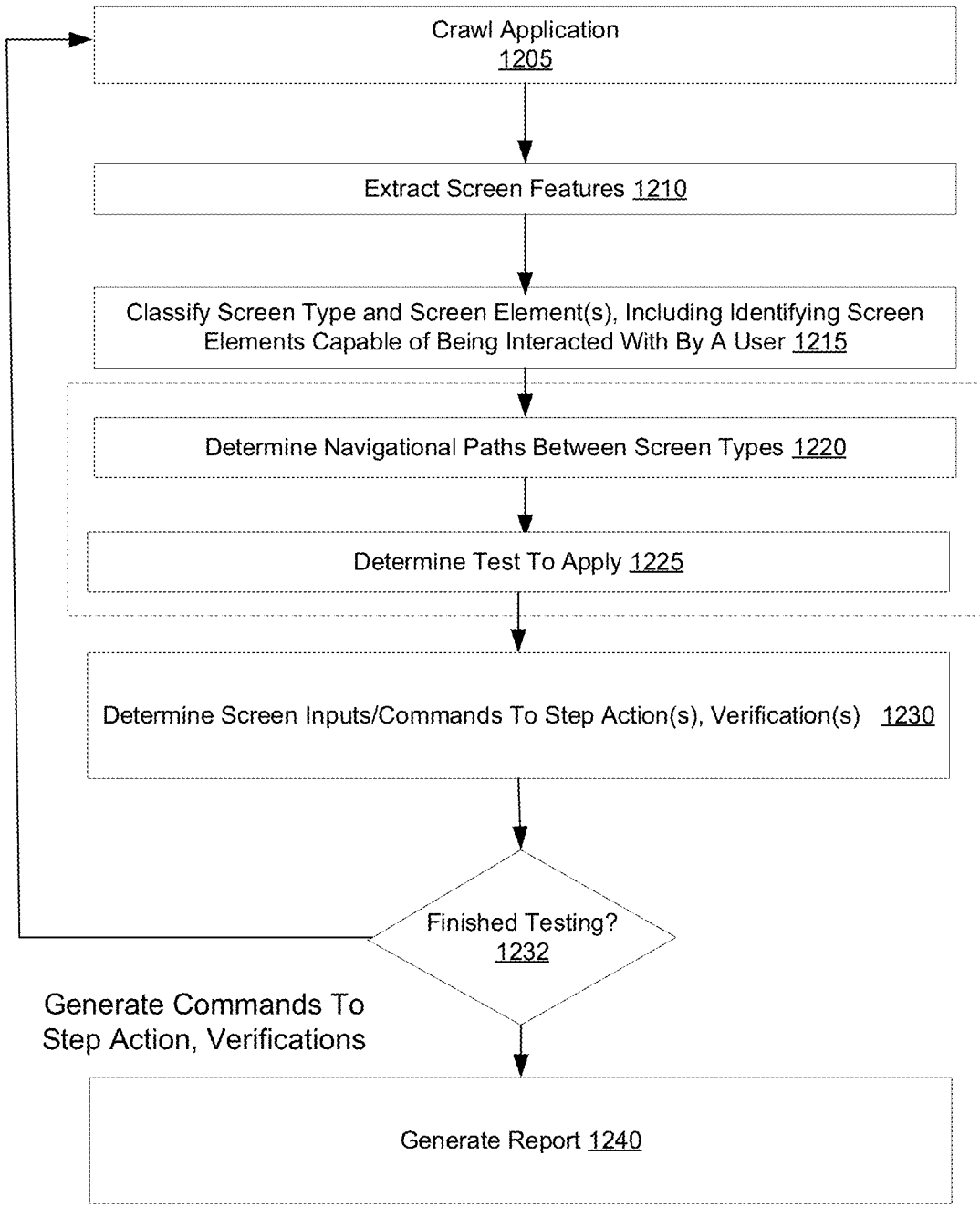
FIG. 12 illustrates a flow chart of a method of testing software in accordance with an embodiment.

FIG. 12 is a flowchart of a general method of testing apps in accordance with an embodiment. The application is crawled in block 1205. Screen features are extracted in block 1210. The screen type and screen elements are classified, including classifying screen elements capable of being interacted with by a user in block 1215. This may include, for example, classifying screen images based on their visual appearance, identifying text on a screen, and considering other screen information. This information may be used to identify potential bugs, such as an error message on a screen.

In block 1220, in one embodiment, navigational paths between screen types is determined. For example, information on the screen type and previous training of the ML system may be used to determine an action likely to result in navigating to a selected screen type. This may include, for example, training for the ML system on common appgraphs and Q-learning as previously discussed to learn how to navigate to specific screen types.

In block 1225, the test to be applied is determined. This may be a previously selected test or it may be based in part on the current screen type and screen elements. In addition to bugs, the tests may include testing a number of steps required to navigate between screen sequences in the app. Thus, in some cases, the determining of a test to be executed and determining navigation paths are closely related, as indicated by the dashed box.

In block 1230, a determination is made of screen inputs/commands to be input to the app to step actions and verifications. This process of testing the app continues until all of the tests have been executed after block 1232. A report is generated in block 1240. The report may, for example, include comparisons with benchmarks, a list of potential bugs, information on a number of steps to execute specified sequences of actions, etc.

Figure 13:
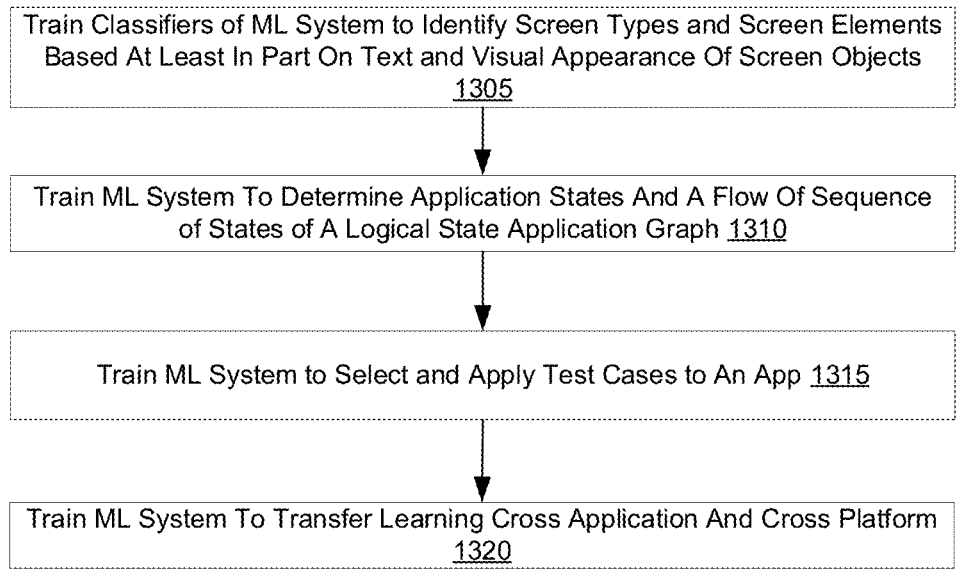
FIG. 13 illustrates a method of training the ML system in accordance with an embodiment.

FIG. 13 is a flowchart illustrating an example of training the ML system in accordance with an embodiment. In one embodiment, in block 1305 the classifiers are trained to identify screen types and screen elements based at least in part on text and visual appearance of screen objects. In block 1310, the ML system is trained to determine application states and a flow of a sequence of states via training to learn logical states of an application graph. In block 1315, the ML system is trained to select and apply test cases to an app. This may include determining an action step and verifications. In one embodiment in block 1320 the ML system is trained to transfer learning cross application and cross platform.

Other Alternate Embodiments and Implementations

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present invention is described in one implementation below primarily with reference to user interfaces and particular hardware. However, the present invention applies to any type of computing system that can receive data and commands, and present information as part of a mobile device.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In one implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the present invention has been presented for the purposes of illustration and description. It is not intended to be exhaustive or to limit the present implementation of invention to the precise form disclosed. Many modifications and variations are possible in light of the above teaching. It is intended that the scope of the present implementation of invention be limited not by this detailed description, but rather by the claims of this application. As will be understood by those familiar with the art, the present implementation of invention may be embodied in other specific forms without departing from the spirit or essential characteristics thereof. Likewise, the particular naming and division of the modules, routines, features, attributes, methodologies and other aspects are not mandatory or significant, and the mechanisms that implement the present implementation of invention or its features may have different names, divisions and/or formats. Furthermore, as will be apparent to one of ordinary skill in the relevant art, the modules, routines, features, attributes, methodologies and other aspects of the present implementation of invention can be implemented as software, hardware, firmware or any combination of the three. Also, wherever a component, an example of which is a module, of the present implementation of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present implementation of invention is in no way limited to implementation in any specific programming language, or for any specific operating system or environment. Accordingly, the specification of the present implementation of invention is intended to be illustrative, but not limiting, of the scope of the present implementation of invention, which is set forth in the following claims.

What is claimed is:

1. An artificial intelligence software testing system to test software applications having a sequence of screens with each screen having a set of screen elements, comprising:
   a set of intelligent machine learning bots trained to:
      crawl through a software application;
      identify screen types and screen elements of the screens using a set of trained classifiers; and
      apply test cases to the software application;
      wherein the software application has an associated logical state graph associated with potential user interactions with a graphical user interface and the set of intelligent machine learning bots are trained to determine application states and sequences of states associated with the logical state graph.

2. The system of claim 1, wherein applying test cases comprises:
   identify test cases based on the identified screen types and screen elements;
   apply the identified test cases to the software application; and
   report test results for the software application.

3. The system of claim 1, wherein the set of intelligent machine learning bots are trained to:
   identify test cases based on the identified screen types, screen elements, and associated application states and sequences of states of the logical state graph.

4. The system of claim 1, wherein the set of classifiers are trained to:
   analyze a visual appearance of screens using at least one classifier trained to analyze a visual appearance of graphical user interfaces;
   identify screen types and screen elements based at least in part on a visual appearance.

5. The system of claim 1, wherein the set of classifiers are trained to:
   determine a screen type based at least in part on a visual appearance of the screen based on an image classification.

6. The system of claim 1, wherein the set of classifiers are trained to analyze elements, screens, and flows of applications.

7. The system of claim 1, wherein the set of intelligent bots are further trained to report performance of the software application.

8. The system of claim 1, wherein the system is configured to test software apps for different platforms by applying a conversion table to adjust the testing for differences in software application appearance and formatting on different platforms, devices, screen sizes, and screen densities.

9. The system of claim 1, wherein the set of classifiers are trained to analyze images on the screens to identify displayable user interface elements of the software application.

10. The system of claim 1, further comprising generating training data for the system based on an initial set of labelled training data for a set of training apps and providing ongoing training data based on feedback from ongoing testing of software apps.

11. The system of claim 1, wherein the system is trained to:
   identify a set of interactable user interface screen elements; and determine navigational paths between at least two different screen types.

12. An artificial intelligence software testing system to test software applications having a sequence of screens with each screen having a set of screen elements, comprising:
 a set of intelligent machine learning bots trained to:
  crawl through a software application;
  identify screen types and screen elements of the screens using a set of trained classifiers; and
  apply test cases to the software application;
  wherein the set of classifiers are trained to recognize screens and screen elements common to a class of software applications having common screen states in a nodal state graph.

13. The system of claim 12, wherein the nodal graph includes at least one of search screen node, a shopping cart screen node, a sign-in screen node, a sign-out screen node, a product screen node and a checkout screen node.

14. An artificial intelligence software testing system to test software applications having a sequence of screens with each screen having a set of screen elements, comprising:
 a set of intelligent machine learning bots trained to:
  crawl through a software application;
  identify screen types and screen elements of the screens using a set of trained classifiers; and
  apply test cases to the software application;
  wherein the software application is represented by an abstract node graph and the set of intelligent machine learning bots includes a set of trained machine learning engine each trained for a subgraph of the node graph.

15. A computer-implemented method to test software applications having a sequence of screens with each screen having a set of screen elements, using a set of intelligent machine learning bots trained to perform a method comprising:
 crawling through a software application;
 identifying screen types and screen elements of the screens using a set of trained classifiers; and
 applying test cases to the software application;
 wherein applying test cases includes identifying test cases based on the identified screen types and screen elements, applying the identified test cases to the software application, and reporting test results for the software application.

16. The method of claim 15, wherein the method comprises the set of classifiers:
 analyzing a visual appearance of screen using at least one classifier trained to analyze a visual appearance of graphical user interfaces;
 identifying screen types and screen elements based at least in part on a visual appearance.

17. The method of claim 15, comprising:
 determining a screen type based at least in part on a visual appearance of the screen based on an image classification.

18. The method of claim 15, wherein the set of classifiers are trained to analyze elements, screens, and flows of applications.

19. The method of claim 15, wherein the set of intelligent bots are further trained to report performance of the software application.

20. The method of claim 15, further comprising testing software apps for different platforms by applying a conversion table to adjust the testing for differences in software application appearance and formatting on different platforms, devices, screen sizes, and screen densities.

21. The method of claim 15, wherein the set of classifiers are trained to analyze images on the screens to identify displayable user interface elements of the software application.

22. The method of claim 15, further comprising generating training data for the system based on an initial set of labelled training data for a set of training apps and providing ongoing training data based on feedback from ongoing testing of software apps.

23. The method of claim 15, comprising training the system to:
 identify a set of interactable user interface screen elements of an app; and
 determine navigational paths between at least two different screen types.

24. A computer-implemented method to test software applications having a sequence of screens with each screen having a set of screen elements, using a set of intelligent machine learning bots trained to perform a method comprising:
 crawling through a software application;
 identifying screen types and screen elements of the screens using a set of trained classifiers; and
 applying test cases to the software application;
 wherein the software application has an associated logical state graph associated with potential user interactions with a graphical user interface and the method further comprises determining application states and sequences of states associated with the logical state graph.

25. The method of claim 24, wherein the method further comprises:
 identifying test cases based on the identified screen types, screen elements, and associated application states and sequences of states of the logical state graph.

26. A computer-implemented method to test software applications having a sequence of screens with each screen having a set of screen elements, using a set of intelligent machine learning bots trained to perform a method comprising:
 crawling through a software application;
 identifying screen types and screen elements of the screens using a set of trained classifiers, including recognizing screens and screen elements common to a class of software applications having common screen states in a nodal state graph; and
 applying test cases to the software application.

27. The method of claim 26, wherein the nodal graph includes at least one of search screen node, a shopping cart screen node, a sign-in screen node, a sign-out screen node, a product screen node and a checkout screen node.

28. A computer-implemented method to test software applications having a sequence of screens with each screen having a set of screen elements, using a set of intelligent machine learning bots trained to perform a method comprising:
 crawling through a software application;
 identifying screen types and screen elements of the screens using a set of trained classifiers; and
 applying test cases to the software application;
 wherein the method includes representing the software application by an abstract node graph and the set of intelligent machine learning bots includes a set of trained machine learning engines each trained for a subgraph of the node graph.

* * * * *